Figures 1, 2, 3:
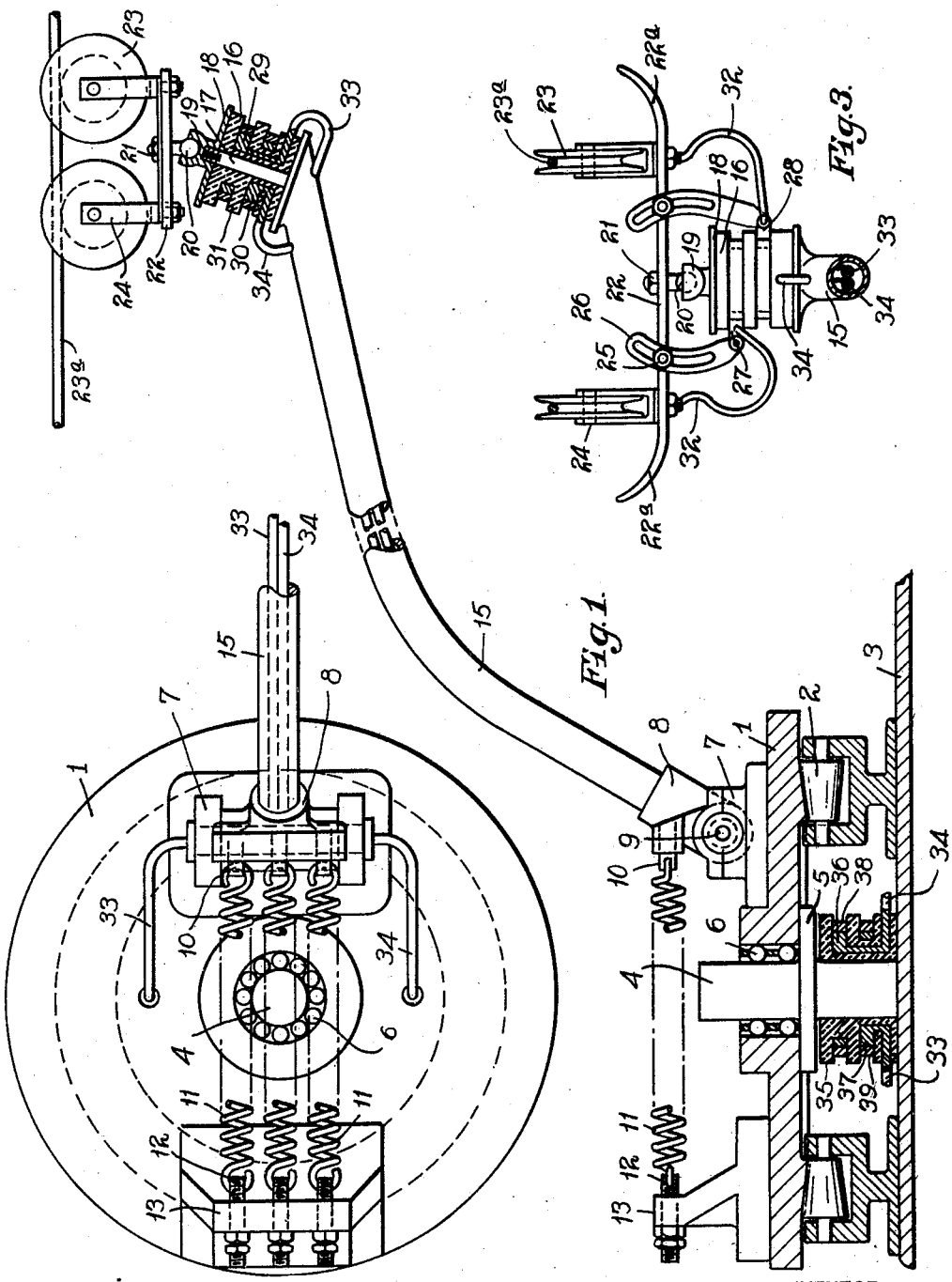

Oct. 13, 1931.  C. L. WILMOT  1,826,854
TROLLEY
Filed March 13, 1930

INVENTOR
Charles L. Wilmot
by
William B. Jaspert
Attorney

Patented Oct. 13, 1931

1,826,854

UNITED STATES PATENT OFFICE

CHARLES L. WILMOT, OF PITTSBURGH, PENNSYLVANIA

TROLLEY

Application filed March 13, 1930. Serial No. 435,498.

This invention relates to trolley structures for trackless trolleys, so-called, and it is among the objects of this invention to provide a trolley or current collecting device which shall be of simple, compact mechanical construction, and efficient in its operation of collecting current, and which shall be constructed to be universal in its movements whereby the vehicle may operate with a relatively large cruising radius from the center of the overhead line structure.

A further object of this invention is the provision of a current collecting device which shall provide relatively large contact area to provide greater stability with the overhead line structure whereby the bearing strains and stresses are distributed to prevent the rapid destruction thereof.

Another object of the invention is the provision of a current collecting device in which the collector elements are mounted for universal movement whereby they maintain ready alinement with the overhead to prevent the collectors from jumping off and which permits the vehicle turning in a complete circle while maintaining effective contact for collecting current at all times.

Another object of the invention is the provision of simple and efficient current collecting and distributing means which permits of the use of a single trolley pole for a multiple overhead line whereby the total weight of the collector and its cost and maintenance is greatly reduced.

These and other objects will become more apparent from a consideration of the accompanying drawings in which like reference characters designate like parts and in which Fig. 1 is a vertical sectional view partially in elevation of a trolley base and current collecting element embodying the principles of this invention; Fig. 2 a top plan view of the base showing a portion of the trolley pole; and Fig. 3 a front elevational view of the current collector.

With reference to the several figures of the drawings, the structure therein illustrated comprises a base 1 supported on roller bearings 2 of a well known type. The bearings 2 are mounted on a supporting base plate 3 on the roof of a trackless vehicle.

The base plate 3 is provided with a center pin 4 having a flange 5 which constitutes a center bearing for the base 1. The base is rotatably supported on the pin 4 by anti-friction bearings 6 and on account of the outboard bearing structure 2 is very stable in a horizontal plane.

Mounted on the base 1 is a pole bracket 7 having a pole socket 8 which is pivotally mounted at 9 to be angularly movable on the base member. The socket 8 is provided with extensions 10 having perforations or eyelets for receiving the hooked ends of springs 11 which at their opposite ends are secured to adjustable screw members 12 carried by a bracket 13, the screw elements being adjustable to vary the spring tension on the trolley pole 15.

The trolley pole is in the shape of a parabolic curve for the purpose of obtaining a maximum length of pole within the limits of the height of the trolley line from the roof of the vehicle, the average height being determined by the available clearances of the route on which such a vehicle is operated. The parabolic shape of the pole further provides for maximum clearance adjacent the base of the trolley which is essential for the prevention of interference with other vehicles in congested traffic lanes.

The pole 15 carries a movable contactor collector ring, generally designated at 16 which is mounted by a bolt 17 secured to the end of the pole 15. A supporting bracket 18 is fastened by the bolt 17 and is provided at its upper end with a socket bearing element 19 adapted to receive a ball member 20 to form a universal joint.

Bearing member 20 is an integral part of a connecting element 21 that is fastened to a yoke 22 which carries a plurality of trolley wheels 23 there being four such wheels, two being shown in the end view of Fig. 1 as contacting with a single overhead line there being two such lines in spaced relation commonly used in trackless trolley operation.

The yoke 22 is provided with horns 22a at its respective ends which are adapted to engage the overhead line 23a to prevent damage if the wheels 23 jump from the lines.

The trolley wheels 23 are journalled in finger brackets 24 which are fastened to the yoke 22 in the manner shown. Although four trolley wheels are illustrated as embodied in the structure, it is of course apparent that this is for the convenience of distributing the pressure on the bearings and also for stabilizing the collector in its contact with the overhead lines, but in operation only one of such wheels need be employed for each line.

With reference to Fig. 3, the yoke 22 is illustrated as provided with rollers 25 that cooperate with slotted guide brackets 26 which stabilize the yoke and also serve as current conductors. The guide brackets are fastened to electric contact elements 27 and 28 that constitute brushes for conductor rings 29 and 30, respectively. The rings or conductor members are suitably insulated from each other by their inherent construction which preferably consist of embedding them in a molded body 31 of a composite material such as the well known phenolic condensation products. The trolley wheels 23 are electrically connected through leads 32 with the contacts 27 and 28, and the conductor elements 29 and 30 are connected by leads 33 and 34, respectively which extend through the pole 15 to the trolley base where they connect to a current collecting drum 35, similar to the element 16 at the upper end of the trolley pole.

The collector 35 is made of insulating material and has a terminal 36 which connects with the conductor 34 and the terminal 37 for the conductor 33, these terminals respectively contacting with brushes 38 and 39 which are electrically connected to the drive motor of the vehicle. By means of the movable terminals at the top of the trolley pole and in the base and the universal movement of the trolley wheel support, and the pole supporting base, the power for operating the vehicle is effectively collected from the overhead trolley line and distributed to the motor. The mechanical feature of the pole base and terminals together with the mechanical construction of the trolley wheel support renders the device universally movable with respect to the movement of the vehicle and the position of the trolley line without subjecting the several parts to undue stresses and without causing such strains as would dislocate the collecting elements from the line with resulting interruption of the service.

By the arrangement of the tension springs any desired tension may be applied to the pole which however need not be excessive on account of the feature of employing the double wheel collectors for each line whereby great stability and contact is maintained without causing undue pressure on the wheel bearings.

Although one embodiment of the invention has been herein illustrated and described, it will be obvious to those skilled in the art that various modifications may be made in the details of construction or arrangement of the several cooperating parts without departing from the principles herein set forth.

I claim:

1. A trolley structure for trackless vehicles comprising in combination a base mounted for angular movement in a horizontal plane, a pole pivotally mounted on said base, a support mounted for universal movement on said pole, trolley wheels carried by said supports, movable contacts disposed between said support base and between the base and the vehicle, and current conductors connecting said trolley wheels and said movable contact members.

2. A trolley structure for trackless vehicles comprising in combination a base having movable contacts for electrically connecting a motor to the source of electrical energy, a pole mounted on said base and a current collecting device mounted for universal movement on said pole, said collecting device being electrically connected to the movable contacts of said base.

3. A current collector comprising in combination with a trolley pole, a wheel support mounted for universal movement on said pole, a plurality of trolley wheels mounted on said support and arranged to constitute a four point contact with a double trolley wire and arcuate guides for said wheel support to prevent movement of said support in one direction only.

4. A current collecting device comprising a base, a rotatable support mounted on said base, a trolley pole pivoted to said supports, current collectors mounted for swivel movement on said pole, movable contacts interposed between said collectors and pole and between said rotatable support and base, and electrical connections between the first named contact members and said collectors and the last named contact member and a motor.

5. A trolley structure for trackless vehicles comprising in combination a base, a pole and a current collecting device, said collecting device comprising a wheel support having a pair of trolley wires in axially spaced relation and said pole being of the shape of a parabolic curve to provide maximum clearance adjacent the base end of the vehicle.

In testimony whereof I have hereunto set my hand.

CHARLES L. WILMOT.